(12) United States Patent
Succar et al.

(10) Patent No.: US 7,698,997 B2
(45) Date of Patent: Apr. 20, 2010

(54) SYSTEM AND METHOD FOR PRODUCING CONCENTRATED FOOD PRODUCTS WITH FRACTIONATION CONCENTRATION (75) Inventors: Jorge K. Succar, Yorba Linda, CA (US); Theodore G. Tishinski, Irvine, CA (US)

(73) Assignee: ConAgra Foods RDM, Inc., Omaha, NE (US)

( * ) Notice: Subject to any disclaimer, the term of this patent is extended or adjusted under 35 U.S.C. 154(b) by 839 days.

(21) Appl. No.: 11/227,640

(22) Filed: Sep. 15, 2005

(65) Prior Publication Data

US 2006/0008573 A1 Jan. 12, 2006

Related U.S. Application Data

(62) Division of application No. 10/489,984, filed as application No. PCT/US02/29606 on Sep. 19, 2002, now Pat. No. 7,074,451.

(60) Provisional application No. 60/323,771, filed on Sep. 19, 2001.

(51) Int. Cl.
*B26D 1/00* (2006.01)
*A23N 1/00* (2006.01)
(52) U.S. Cl. .............. 99/511; 99/495; 99/496
(58) Field of Classification Search ............ 99/495, 99/496, 510, 511; 210/781, 360.1; 494/53, 494/27, 85; 426/481, 482, 615, 656
See application file for complete search history.

(56) References Cited

U.S. PATENT DOCUMENTS

| | | | |
|---|---|---|---|
| 2,890,961 A | 6/1959 | Davis | |
| 3,172,770 A | 3/1965 | Miller | |
| 3,404,012 A | 10/1968 | Craig | |
| 3,698,559 A | 10/1972 | Manjikian | 210/321 |
| 3,864,504 A | 2/1975 | Szabo, et al. | |
| 5,035,909 A * | 7/1991 | Lomelin et al. | 426/473 |
| 5,151,079 A * | 9/1992 | Flanigan et al. | 494/27 |
| 5,156,751 A * | 10/1992 | Miller | 210/787 |

(Continued)

FOREIGN PATENT DOCUMENTS

EP  1222864  8/2001

(Continued)

OTHER PUBLICATIONS

Perry, R.H., "Liquid Solid Operations and Equipment", *Perry's Chemical Engineers' Handbook*, 7th Edition (1997) pp. 18-113-18-115.

(Continued)

*Primary Examiner*—Reginald L Alexander
(74) *Attorney, Agent, or Firm*—Merchant & Gould P.C.

(57) ABSTRACT

An improved processing method and system for producing tomato paste and other food products affected by viscosity. Tomatoes are processed into tomato juice. The juice is provided to a decanter that separates or fractionates the juice into two portions—a thicker, more viscous cake portion and a thinner, less viscous serum portion. The serum portion is concentrated by removing a portion of water using an evaporator such as a thin film or juice evaporator. The cake portion can be concentrated if necessary with a drier. The serum and cake portions are re-combined to produce a tomato paste having improved color, texture, flavor and nutrition.

26 Claims, 8 Drawing Sheets

U.S. PATENT DOCUMENTS

| | | | |
|---|---|---|---|
| 5,172,487 A | 12/1992 | Hansen et al. | 34/5 |
| 5,229,160 A * | 7/1993 | Lang | 426/615 |
| 5,259,828 A * | 11/1993 | Schlieperskoetter | 494/38 |
| 5,338,285 A | 8/1994 | Omori | |
| 6,291,000 B1 | 9/2001 | Hayakawa | 426/422 |
| 6,335,373 B1 | 1/2002 | Yosef et al. | |
| 6,515,018 B1 | 2/2003 | Fuhrman et al. | |
| 6,555,134 B1 | 4/2003 | Aviram et al. | |
| 7,074,451 B2 | 7/2006 | Succar et al. | |

FOREIGN PATENT DOCUMENTS

| | | | |
|---|---|---|---|
| FR | 2 625 652 A | 8/1994 | |
| IT | 320369 | 8/1934 | |
| JP | 403047056 A | 7/1989 | |
| JP | 403091464 A | 9/1989 | |
| JP | 403091465 A | 9/1989 | |
| JP | 403195482 A | 12/1989 | |
| JP | 411046735 A | 8/1997 | |
| NL | 7 708 756 A | 7/1989 | |
| WO | WO 97 48287 | 12/1997 | |
| WO | WO 03/024243 | 9/2002 | |

OTHER PUBLICATIONS

Dale, M.C. et al., "Concentration of Tomato Products: Analysis of Energy Saving Process Alternatives", vol. 47 (1982) *Journal of Food Science* pp. 1853-1858.

Tanglertpaibul T. et al., "Flow Properties of Tomato Concentrates: Effect of Serum Viscosity and Pulp Content", vol. 52 (1987) *Journal of Food Science* pp. 318-321.

C.A. Merlo et al., Separation, Fractionation Concentration and Drying of Food Products, Addendum Report, Aug. 1989.

Rolando Cultrera E Also Buffa, Appunit Per Nuivi Diagrammi Nell'Industria Del Pomodoro, Parma, Statione Sperimetale per l'Industria dellsConserve Alimentari, Sep. 2, 1954.

\* cited by examiner

SYSTEM AND METHOD FOR PRODUCING CONCENTRATED FOOD PRODUCTS WITH FRACTIONATION CONCENTRATION

CROSS REFERENCE TO RELATED APPLICATIONS

The present application is a divisional of co-pending U.S. application Ser. No. 10/489,984, filed Mar. 17, 2004, priority of which is claimed under 35 U.S.C. § 120, which is a national stage application of International Application No. PCT/US02/29606, filed Sep. 19, 2002, which claims priority under 35 U.S.C. ¶ 119 of United States Provisional Application No. 60/323,771, filed Sep. 19, 2001, all of which are incorporated herein by reference as though set forth in full.

FIELD OF THE INVENTION

This invention relates to food products and a system and method for producing food products. In particular, the present invention relates to tomato paste and similar food items that are produced by separating tomatoes or food items into portions or fractions having different viscosity, concentrating one or more of the portions, and re-combining the portions to form a food product such as tomato paste.

DESCRIPTION OF RELATED ART

Tomatoes or derivative tomato products such as juice, puree and paste can be added as food ingredients to a food product to provide, for example, flavor, color, texture and viscosity. Tomato paste is one common product produced from tomatoes. To produce tomato paste, water is typically removed from tomatoes or tomato juice via dehydration or evaporation.

Using tomato paste can be advantageous, compared to fresh tomatoes or tomato juice, for a number of reasons. For example tomato paste may provide improved taste, appearance, and be advantageous for the following economic considerations:

a. Storage capabilities—aseptically bulk packaged tomato paste can be stored for extended periods of time (e.g., up to several years) prior to consumption. These storage capabilities provide flexibility in shipping, transportation, and sales.

b. Reduced shipping costs—bulk tomato paste typically weighs less than raw tomatoes as a result of lower water content. Thus, shipping costs are reduced.

c. Supply flexibility—a year round supply of tomato paste can be maintained in spite of the season for harvesting fresh tomatoes being approximately 100 days.

d. Cooking requirements—some products require tomato paste rather than fresh tomatoes or tomato juice based on a recipe's water content limitations.

Known system typically process tomatoes by directly processing the entire or unfractionated tomato stream. For example, tomatoes are chopped into a liquid or liquid-like product and supplied to an evaporator. The unfractionated tomato stream becomes increasingly concentrated as the evaporator heats the tomato stream and removes water from the stream.

Such conventional systems, however, typically have a number of shortcomings. First, as the paste product becomes more viscous (thicker or more resistant to flow), the tomato paste becomes increasingly more difficult to manipulate. The increasing viscosity is the result of vacuum, heat, shear and recirculation of the thickening paste. Portions of the paste can be "burned" onto evaporator surfaces as the surfaces are heated and the viscous paste can stick to the surfaces. Consequently, the resulting tomato paste can be burned or overheated, resulting in diminished tomato paste quality, e.g., reduced color, flavor and nutrients.

Moreover, additional cleaning and maintenance of evaporator equipment may be necessary as a result of the "burning" effect. Maintenance and cleaning requires additional time and resources which, in turn, lead to inefficient processing and reduced production capabilities. Additionally, in order to process the increasingly viscous paste, known systems typically use more powerful evaporators that can handle higher viscosity paste. These types of evaporators may use re-circulation turbine pumps to pump and re-circulate the increasingly viscous tomato paste. These more powerful, larger evaporators usually are more expensive. Further, larger evaporators typically consume more power and are more expensive to operate. Additionally, processing unfractionated streams of tomato juice typically takes a significant amount of time (e.g., two to three hours for a reasonable sized batch). Consequently, systems that produce tomato paste by directly processing unfractionated streams of juice often are not time, cost, and energy efficient and can produce lower quality tomato paste.

Other known systems separate portions of tomato paste to form derivative products. For example, a portion can be removed from a tomato juice stream, and the evaporator can concentrate the remaining portion. Typically, however, these known systems also have a number of shortcomings. First, these systems produce separated components that are useful only in limited circumstances based on the quality and nature of the components. For example, the thicker component is typically a dense, powder-like substance that can be milled and used as a flavoring. The thicker component, however, is often not suitable for tomato paste. Further, the remaining portion is often too thin to be used as tomato paste. Thus, these known systems separate components of a tomato stream, but may not be able to produce tomato paste in an effective matter. Further, the dense powder and liquid components typically cannot be combined due to their different compositions. If the portions are combined, a low quality, chalky tomato paste-like product may be produced having diminished color, texture, and taste. Thus, known systems that separate tomato components are often not as effective as desired to produce quality tomato paste in an efficient manner.

There is a need, therefore, for a system and a method for producing tomato paste and other similar products with improved viscosity, color, nutrients and flavor in a more cost, energy and time efficient manner.

SUMMARY OF THE INVENTION

The present invention provides an improved system and method for processing tomato products to produce a paste with enhanced taste and color in a more efficient manner.

One embodiment of the present invention provides a system and method that processes tomatoes into a stream of tomato "juice." The juice stream is separated or fractionated into two portions—a serum portion and a cake portion. The serum portion has a lower viscosity than the cake portion. In other words, the cake portion is thicker and more resistant to flow relative to the serum portion. After these portions are separated, the serum portion is concentrated using, for example, an evaporator. The cake portion can also be concentrated, if desired, using a drier mechanism or other suitable evaporator. The cake portion and the concentrated serum portion are re-combined to form an improved tomato paste.

Alternatively, the portions can be separately processed and/or packaged as separate products or ingredients.

The cake portion includes a majority of insoluble solids relative to the serum portion. As a result, the serum portion can be concentrated more easily with an evaporator for enhanced appearance and taste. Further, less evaporation time and energy are required to process the serum portion, thereby reducing capital and energy costs associated with the evaporator. Thus, less expensive and robust evaporators can be used. A drying mechanism can be used to concentrate the cake instead of an evaporator. As a result, the present invention can reduce or eliminate-degradation of tomato juice stream resulting from "burn on" of cake components onto evaporator surfaces. Further, cleaning and maintenance costs can be reduced while producing a tomato paste product with enhanced flavor, texture, color and nutrition.

Also in accordance with the present invention, a decanter can be used to separate tomato juice into cake and serum portions. The decanter can separate the portions using different techniques. One exemplary decanter is configured as a centrifuge with an inner weir. As the centrifuge rotates, the cake gravitates to the inner surface of the decanter and is separated from the serum with the weir. The fractionated cake portion can advantageously have the following characteristics: about 5%-35% of the tomato stream by weight, about 5%-60% insoluble solids by weight, about 3%-16% soluble solids by weight and a concentration of about 3-13 brix. The fractionated serum portion can have the following characteristics: about 65%-95% of the tomato stream by weight, about 0(trace)-10% insoluble solids by weight, about 3%-17% of soluble solids by weight and a concentration of about 3-16 brix.

In further accordance with the invention, if the cake and serum streams are re-combined, the concentration of the re-combined stream can have a concentration of about 15-40 brix. If the cake and serum portions are not re-combined, the cake portion can have a concentration of about 5-99% of solids. For example, a thick cake can be formed if the cake portion is about 5% solids, whereas a powder that can be milled can be formed if the cake portion is about 99% solids. The serum portion can be concentrated to a concentration of about 22-75 brix.

BRIEF DESCRIPTION OF THE DRAWINGS

Referring now to the drawings in which like reference numbers represent corresponding parts throughout.

DETAILED DESCRIPTION

In the following description of embodiments of the invention, reference is made to the accompanying drawings which form a part hereof, and which is shown by way of illustration specific embodiments in which the invention may be practiced. It is to be understood that other embodiments can be utilized as structural changes may be made without departing from the scope of the present invention.

Figure 1:
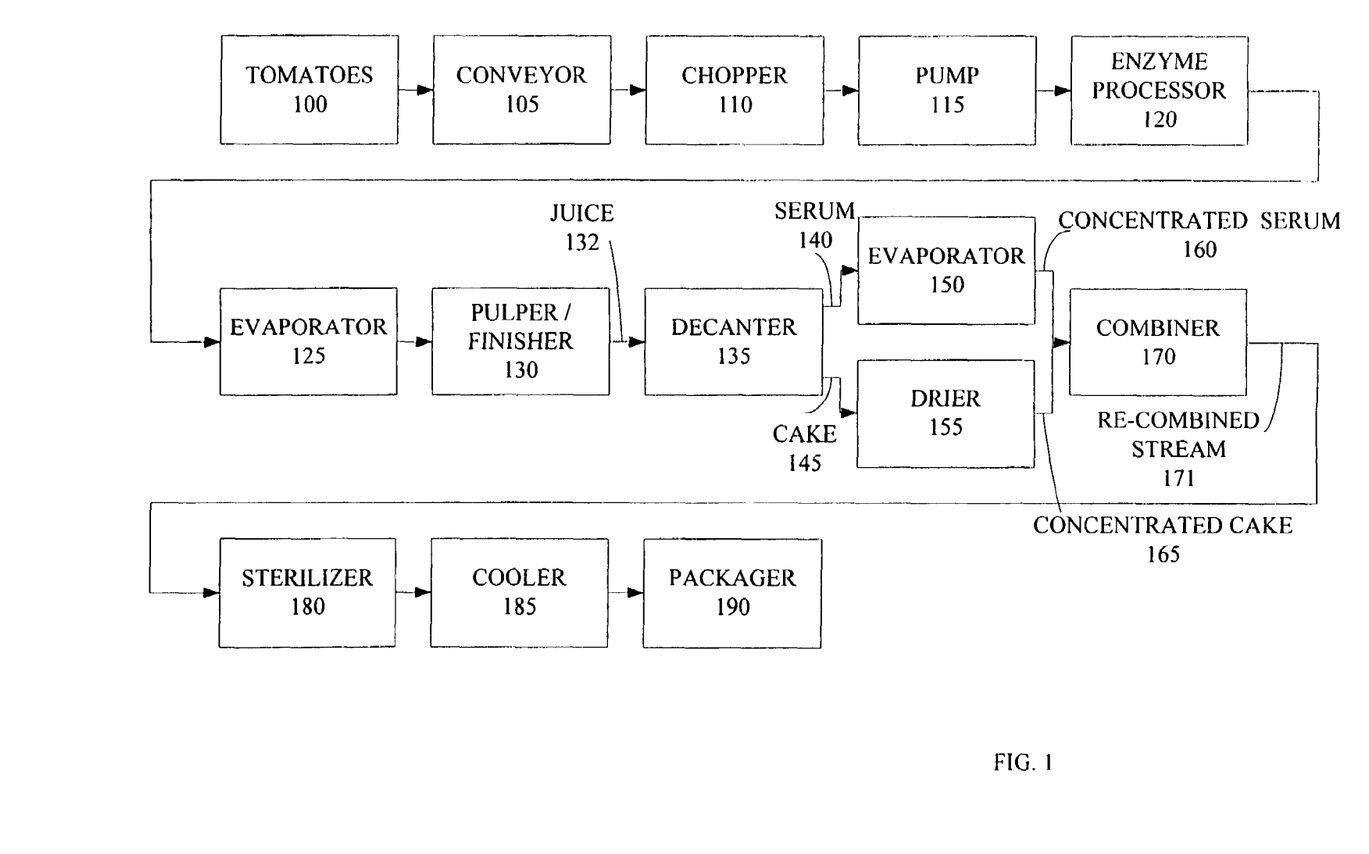
FIG. 1 is a general block system diagram of portions used to process a stream of tomato juice by fractionating the juice into cake and serum portions, and re-combining the portions to form a tomato paste.

One aspect of the invention provides a processing system that fractionates or separates tomato juice or a tomato stream or other similar substance into different portions, i.e., cake and serum portions, and later re-combines the portions. As generally illustrated in FIG. 1, the processing system transports a product 100, such as tomatoes, on a conveyor or other transport system 105. Those persons of ordinary skill in the art will recognize that various tomato products 100 can be processed, such as fresh tomatoes, tomato juice, tomato slurry, a mixture of tomato juice and tomato pulp, or other tomato derivatives. However, the invention is not so limited. Those persons of ordinary skill in the art will also recognize that other food products can be processed. For example, the present invention can be used to process or produce other food items that are affected by viscosity such as, for example, chili paste (which can be thicker than tomato paste), and other fruit or vegetables where limiting viscosities prevent or inhibit evaporation, such as peas for pea soup. A further example application of the present invention is to process apples or apple cider to form a concentrated apple puree. The puree can be used to make apple pies and other apple products. However, for purposes of explanation, this specification refers to processing raw tomatoes into a "juice" that is fractionated into serum and cake portions that can be re-combined to form a tomato paste after one or more of the portions has been concentrated.

Tomatoes are transported along the conveyor and are chopped with a chopping mechanism 110. Chopped tomatoes are provided via a pump 115 to an enzyme processor 120 for enzyme breaking or inactivation. The chopping mechanism 110 can be one of many mechanisms that chops tomatoes into tomato pieces including, but not limited to, a knife, a rotating knife, rotating blades, a blender mechanism, and other cutting and chopping devices capable of cutting fruits and vegetables. Alternatively, the chopper 110 and pump 115 can be combined into a single unit. For example, a device that combines both chopping and pumping functions is chopper pump model no. STH4R12S, available from Vaughn, Co., Inc., Montesano, Wash.

The enzyme processor 120 removes selected enzymes that affect the viscosity of chopped tomatoes. In other words, enzymes are inactivated during "hot breaking" or "enzyme breaking." Example enzymes that can be removed or inactivated include pectin galacturonase, pectin methyl esterase and other enzymes in fresh tomatoes. One exemplary enzyme processing or "breaking device" 120 that can be used is model G El Dorado, available from Rossi & Catelli S.P.A., Parma, Italy. This exemplary enzyme breaking device can be set to operate at different configurations and temperatures for hot or cold breaking, as later described.

If necessary, the chopped tomatoes can be processed with an initial or preliminary evaporator 125. The initial evaporator 125 removes a portion of the water from the chopped tomatoes to make the tomatoes more viscous or thicker. One exemplary evaporator 125 that can be used for this purpose is a T.A.S.T.E. evaporator, available from FMC Food Tech, Inc., Citrus Systems Division, Lakeland, Fla. Another exemplary evaporator 125 that can be used is an EC series rising film evaporator, available from Tetra-Pak, Inc., Vernon Hills, Ill.

Enzyme inactivated tomato pieces can be further processed and filtered using a pulper or finisher 130. One exemplary pulper/finisher 130 that can be used is a Butterfly TC6 depulper, available from Rossi & Catelli S.P.A., Parma, Italy. The pulper or finisher 130 removes solids from the tomatoes such as outer skins and/or seeds to form a tomato "juice" or "juice stream" 132. More specifically, one type of the pulper/finisher 130 forces chopped tomatoes through a screen, filter, or filter screen having holes or apertures of specific size. Example screen sizes that can be used to remove seeds and/or peels to form the juice have apertures with dimensions of approximately 0.027" to 0.156". Most tomato seeds can be removed with screen having apertures of up to 0.074". As tomato pieces pass through the apertures, seeds and/or peels are removed or filtered from the tomatoes to produce tomato juice 132. As a result, the juice 132 includes portions less than or equal to the size of the finisher-pulper 130 screen. Different food products can be processed with different pulper-finisher apertures depending on the quantity and size of seeds and desired smoothness or coarseness of fibers in the juice 132.

Those persons of ordinary skill in the art, however, will recognize that one or more of the portions 110-130 may not be necessary depending on the characteristics and type of tomato or food product processed. However, for purposes of explanation, this specification refers to the pulper/finisher 130 producing "tomato juice" 132, although juice 132 may be formed at different stages.

The tomato juice 132 is supplied to a decanting centrifuge 135 (hereafter referred to as decanter 135). The decanter 135 separates or fractionates juice 132 into a serum portion 140 and a cake portion 145. One exemplary decanter that can be utilized is a Tetra Aldex® decanter, model no. NX438, available from Tetra-Pak, Inc., Vernon Hills, Ill. This example decanter uses a weir to separate the portions, as will be later described in further detail in connection with FIGS. 3 and 4. Another decanter that can separate tomato juice or tomato puree 132 into cake 140 and serum 145 portions is a clarifier decanter, model no. CA 755-0012 or model no. CA 755-01-12, available from Westfalia Separator, Inc., Northvale, N.J.

Those persons of ordinary skill in the art will recognize that various decanters and decanter configurations can be used. For example, instead of a centrifuge, the same fractionation technique can be achieved by using a press with one or more apertured filter screens (which can be used for processing apples or apple cider). A further alternative fractionation device can be a filtration membrane such as an ultrafiltration membrane. However, for purposes of explanation, this specification refers to a decanting centrifuge for fractionating a juice stream 132 into serum 140 and cake 145 portions.

The serum portion 140 is concentrated using an evaporator 150. The output of the evaporator 130 is a concentrated serum 160. Evaporator 150 can be the same as the initial evaporator 125 or similar. However, since the serum is thinner and less viscous than the cake portion or an unfractionated tomato stream, a smaller (and usually less expensive and more energy efficient) evaporator 125 can advantageously be used to concentrate the serum portion 140. One exemplary evaporator 125 that can concentrate the serum portion 140 is a juice evaporator, Thermally Accelerated Short Time Evaporator (T.A.S.T.E.) 6 effect 6 stage available from FMCFoodTech Food Processing Systems, Parma, Italy. As a result of using a smaller evaporator, capital expenditures and energy costs for processing food products can be reduced. Further, concentration times can also be reduced since the serum is thinner than an unfractionated stream and easier to process in a shorter period of time. For example, some known systems may take an hour or more to process a batch of unfractionated tomatoes into a tomato paste. However, the thinner, fractionated serum can be processed in less time with a smaller evaporator (e.g., 5 minutes-1 hour).

The cake portion 145 can also be concentrated, if necessary with, e.g., a drier 155 to produce a dried cake portion 165. One exemplary drier 155 that can be used is a Refractance Window™ drier, available from MCD Technologies, Inc., Tacoma, Wash. With this exemplary drier, the cake 145 can be sprayed across the belt with a sprayer (not shown) and passed through the drier to evaporate water from the cake, thereby forming a concentrated cake portion 165. Other evaporation systems can also be used to concentrate the cake.

The concentrated serum portion 160 and the cake portion 145 (or concentrated cake 165, if desired) are re-combined using a combiner or combination unit 170 to form a re-combined stream 171 or tomato paste product. One exemplary combination unit 170 that can be used is a positive displacement pump, model no. 220, available from Waukesha Cherry Burrell Products, Delvan, Wis. Alternatively, the combiner 170 can be an in-line static mixer, e.g., model no. SAN 42499, available from Komax Systems, Inc., Wilmington, Calif. Indeed, various combiners 170 can be used. The re-combined or second juice stream 171 output by the combiner 170 is sterilized with a sterilization unit 180, as necessary, and cooled with a cooling mechanism or cooler 185, as necessary. The tomato paste can be packaged, shipped, stored for later consumption, or further processed as desired.

Figure 2:
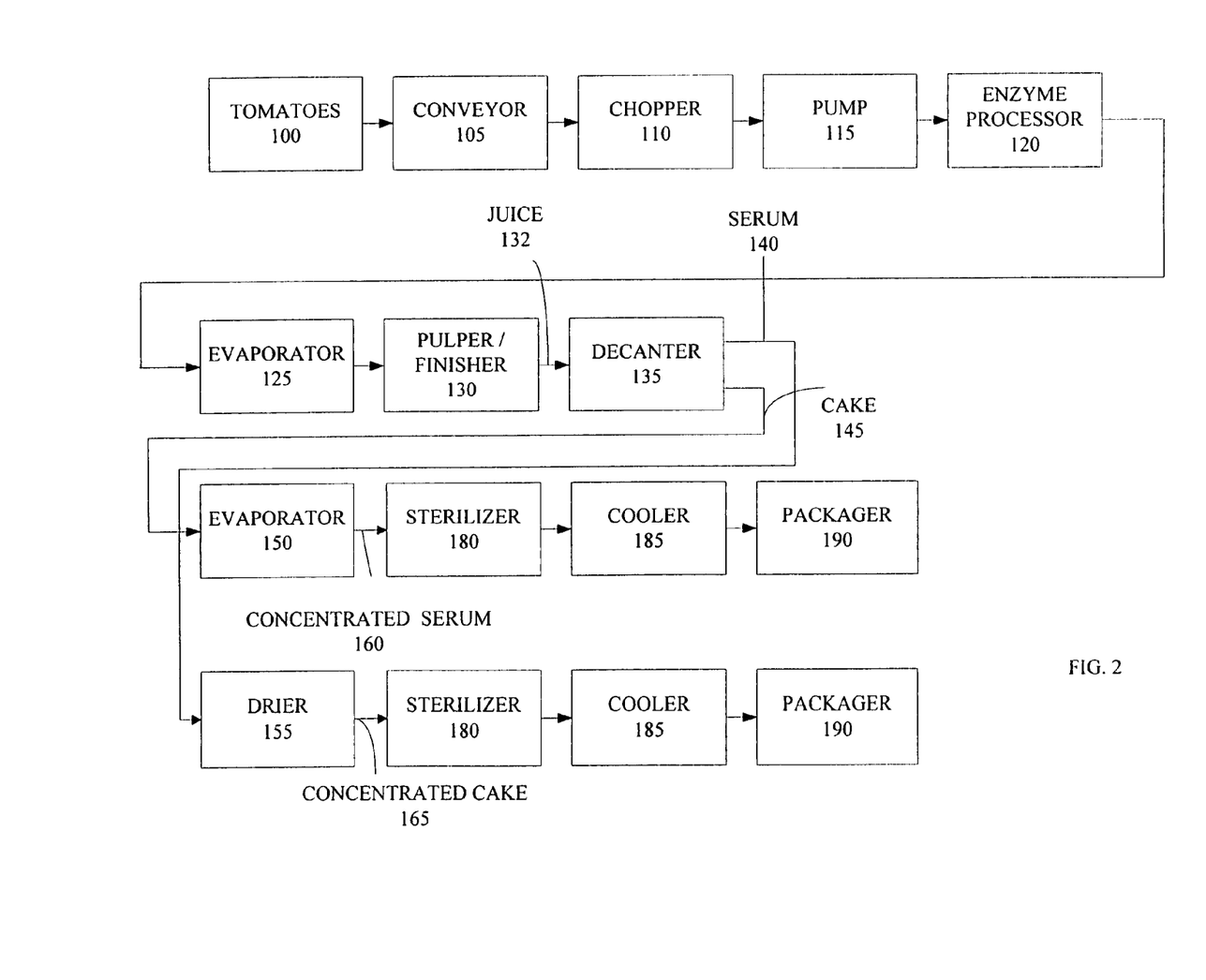
FIG. 2 is a general block system diagram of portions used to process tomato juice by fractionating the juice into cake and serum portions, and separately processing the portions.

Referring now to FIG. 2, in an alternative embodiment, the serum 140 and cake 145 portions are not re-combined. Instead, the serum and cake portions are processed individually. More specifically, the juice stream 132 is processed by the decanter 135 to produce the serum 140 and cake 145 portions as previously described. The serum portion 140 is concentrated with an evaporator 150 to produce a concentrated serum portion 160. The cake portion 145 can be concentrated, if necessary, with a drier to produce a concentrated cake portion 165. However, the cake and serum portions are then separately processed, e.g., are sterilized with one or more sterilizers 180, cooled with one or more coolers 185 and packaged with one or more packagers 190. Thus, in this alternative embodiment, serum and cake portions are separately produced whereas tomato paste is ultimately produced by re-combining the portions as illustrated in FIG. 1. The resulting concentrated serum 160 can be used as a soup base or flavoring since it is thinner than the cake. The cake portion 145 or concentrated cake portion 165 can be used as a color ingredient, a source of nutritional fiber for foods including a tomato product, and a source of lycopene.

These and other aspects of the present invention are described in further detail with reference to the system and decanter diagram of FIG. 4, and flow diagrams of FIGS. 5A-B and 6A-B.

Figure 3:
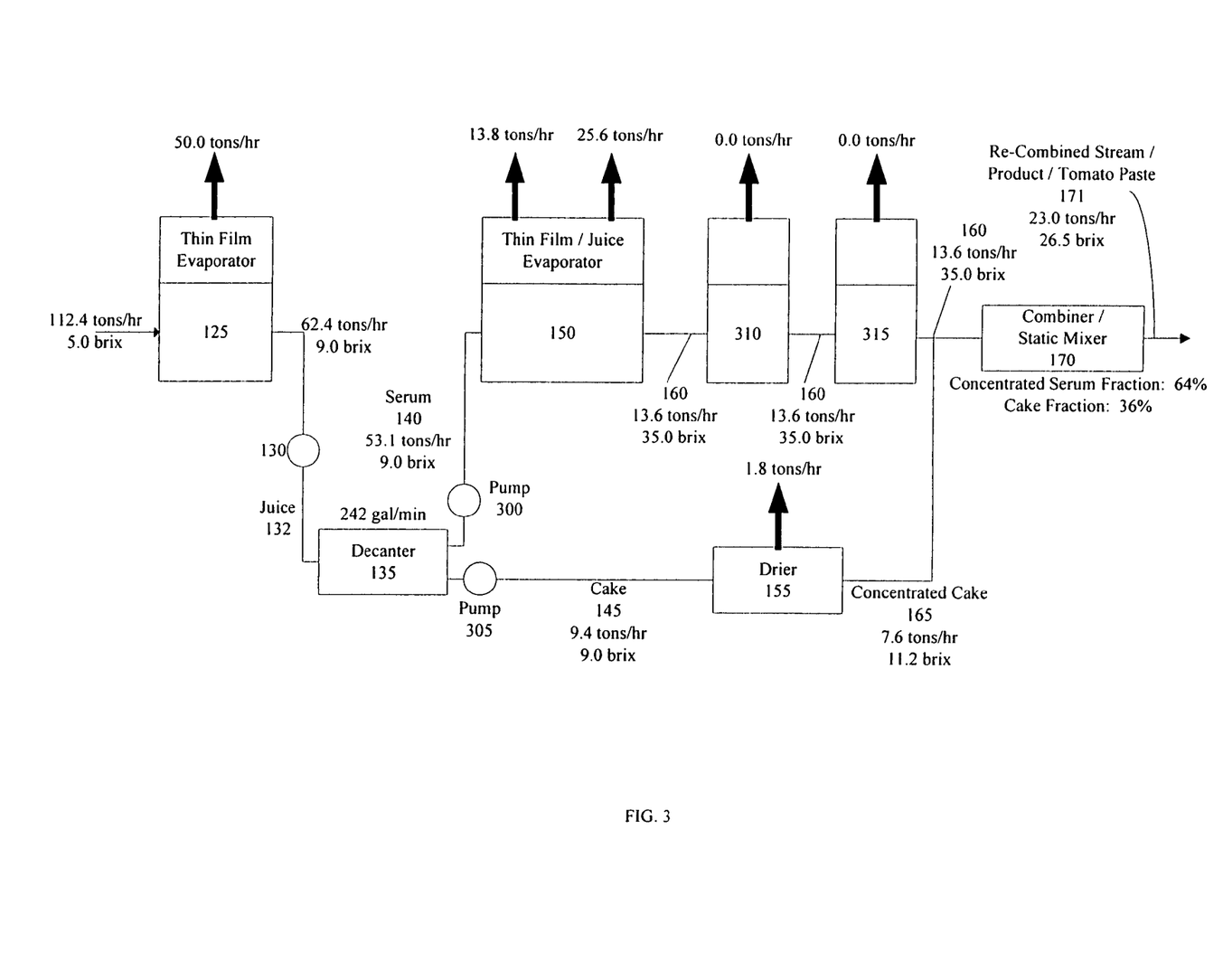
FIG. 3 is a system diagram illustrating one example system configuration and example operating parameters.

FIG. 3 illustrates one exemplary system configuration for processing tomatoes by re-combining the serum and cake portions to form the tomato paste. Of course, those persons of ordinary skill in the art will recognize that the following system parameters are merely illustrative of many system parameters and are not so limited. Further, FIG. 3 illustrates the primary portions of the system. For example, depending on the state and type of tomatoes, chopping, pulping, and enzyme breaking may be performed. Additionally, one or more additional pumps may be used to direct the juice, serum portion, cake portion, and tomato paste product to the next processing portion.

Initially, tomatoes 100, are provided to an evaporator 125, such as a thin film evaporator, at a rate of about 112.4 tons per hour (tons/hr) at a concentration of about 5 brix. Different tomatoes with different brix concentrations can be processed, but the concentration of raw tomatoes can range from 3-7 brix. The concentration measurement "brix" refers to a percentage of sugar and other soluble solids present in the tomatoes. Thus, for example, tomato pieces having 3-7% sugar or soluble solids have a concentration of 3-7 brix. Tomato products having higher brix concentrations are generally sweeter and more flavorful as a result of higher sugar content.

The evaporator removes moisture from the tomatoes at a rate of about 50.0 tons/hr and outputs the tomatoes at about 62.4 tons/hr with a concentration of about 9 brix. The tomatoes can be processed by a pulper 130 resulting in a juice stream 132. The juice stream 132 is then processed by the decanter 135 at about 242 gallons per minute (gal/minute). The decanter fractionates the juice into serum and cake portions 140, 145 that are pumped through respective pumps 300, 305. The serum is pumped to an evaporator 150, such as a thin film/juice evaporator, at a rate of about 53.1 tons/hr at a concentration of about 9.0 brix. The cake 145 is pumped to a drier 155 at a rate of about 9.4 tons/hr at a concentration of about 9.0 brix. As previously mentioned, evaporator 150 can be a less robust (and less expensive) evaporator, such as a thin film juice evaporator, since it is processing the "thin" serum portion 140 of the juice stream 132. The evaporator 150 removes moisture from the serum 140 at rates of about 13.8 tons/hr and 25.6 tons/hr, thereby concentrating the serum. The concentrated serum 160 exits the evaporator 150 at a rate of about 13.6 tons/hr at an increased concentration of about 35.0 brix. If needed, the concentrated serum 160 can be further concentrated with additional evaporators 310 and 315. However, this example configuration does not utilize these additional evaporators as shown by consistent flow rates into the combiner 170, but are illustrated to show additional optional concentrating.

The drier 155 removes moisture from the cake 145 at a rate of about 1.8 tons/hr, resulting in concentrated cake 165 exiting the drier 155 at a rate of about 7.6 tons/hr with a concentration of about 11.2 brix. Those persons of ordinary skill in the art will recognize that the drier 155 is optional. The concentrated serum 160 and the cake 145 or concentrated cake 165 are re-combined using combiner 170, such as a static mixer. The re-combined stream 171 includes about 64% serum by weight and about 36% cake by weight. The resulting stream 171 or tomato paste product exits the combiner 170 at a rate of 23.0 tons/hour with a concentration of 26.5 brix. Those persons of ordinary skill in the art will recognize that many variations on the previously described operating parameters can be used.

Figure 4:
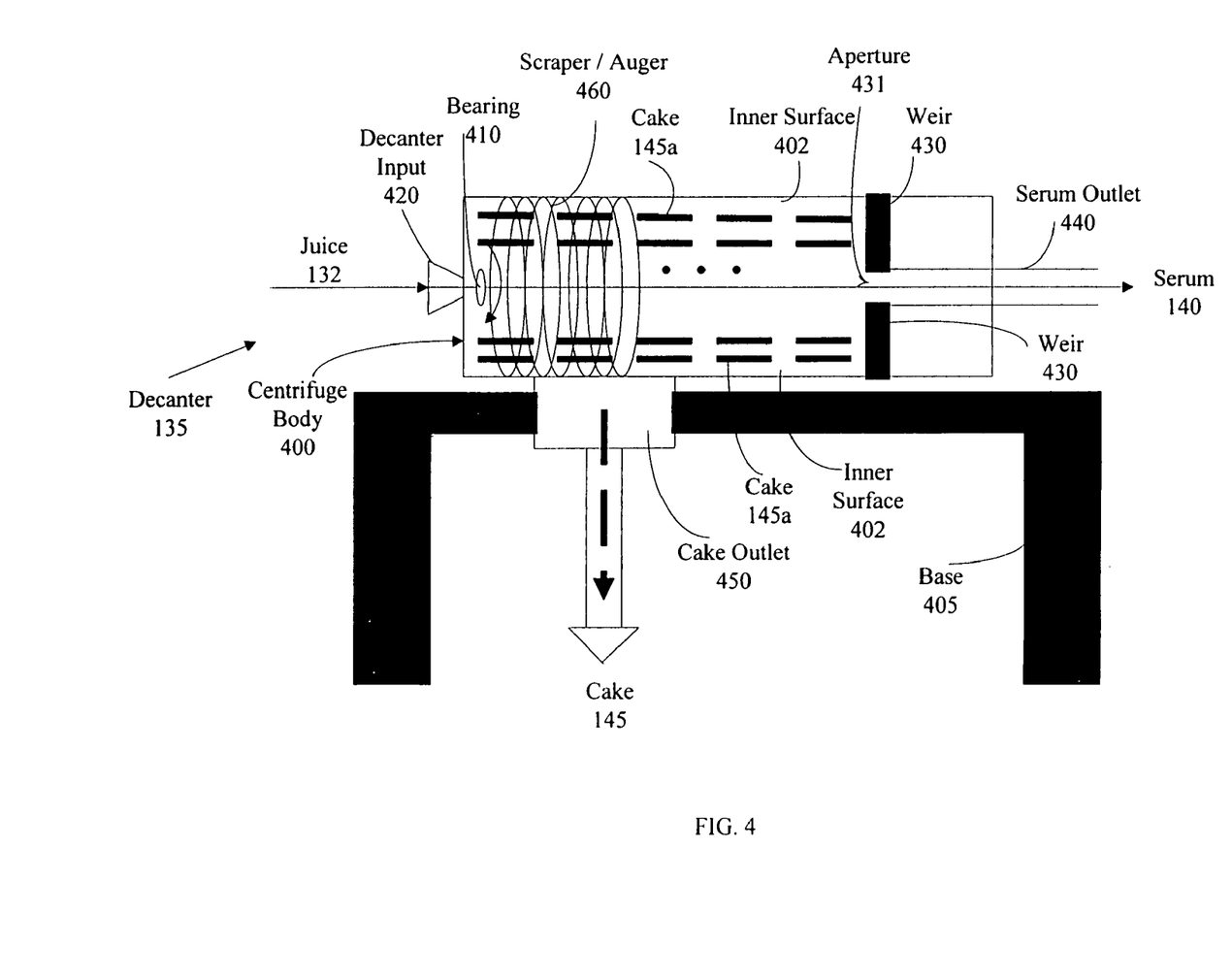
FIG. 4 is a diagram illustrating an example decanter configuration for fractionating a tomato juice stream into cake and serum portions.

Turning to FIG. 4, one exemplary decanter 135 includes a centrifuge body 400 supported by base 405. The centrifuge body 400 rotates around a bearing 410. The decanter includes an input 420, weir 430, serum output 440, cake output 450 and a scraping mechanism such as rotating auger 460.

Juice 132 is provided to the decanter 135 through the input 420. As the decanter rotates, the thicker cake portion is separated from the serum section. The cake portion gravitates to the inner surfaces 402 of the centrifuge body 400. The less dense serum portions remain in the general middle area of the decanter, i.e., the thinner serum does not tend to migrate to the inner surfaces of the centrifuge body. The cake portions 145 collecting around the inner surfaces 402 of the centrifuge body 400 are illustrated as dashed lines 145a in the top and bottom sections of the decanter cross section.

The weir 430 can be an interior wall or ring with an inner aperture 431. The weir serves as a wall to hold the cake and block it from exiting through the serum outlet 440. Thus, the weir separates the cake and serum portions and permits the less dense, thinner serum 140, to pass through the decanter through the serum outlet 440. The weir height is selected such that the cake portion is retained against the inner surface of the centrifuge body, thereby separating the cake from the serum. The cake can be removed from the decanter via cake output 450 near the bottom of the body. More specifically, the cake can be "scraped" off the inner surface of the rotating centrifuge bowls by, for example, a rotating scraper or auger 460 (partially illustrated in FIG. 4). The auger surfaces rotate along the inner surface of the centrifuge body, thereby removing the cake 145a from the inner surface. The cake is then directed to the cake outlet or discharge port 450. The scraper can be configured to closely scrape the wall or be positioned further away from the inner surface such that the scraper removes a smaller quantity of cake from the inner surface of the centrifuge body. Cake and serum separation can be adjusted by adjusting the rotation speed of the decanter, rotating speed of the internal cake scraping auger (scroll speed differential), product temperature and the height of the weir.

One example decanter or centrifuge 135 that can be used is a Tetra Pak Inc., NX438 centrifuge operating at approximately 3400 revolutions per minute (rpm), having a 132 millimeter (mm) pond depth weir plate and a scroll speed differential of 20-40 rpm. The separation efficiency of the decanter is improved as the temperature increases. A temperature of approximately 180 to 190 degrees Fahrenheit typically results in separation of the cake and serum portions at the example speed.

Those persons of ordinary skill in the art will recognize that other scraping mechanisms can be utilized for removing cake from an inner surface of the centrifuge body. For example, instead of a rotating auger, the scraper can be a member that is displaceable along one or more of the inner top, bottom or side surfaces of the centrifuge body. Thus, the displaceable member can move from one end of the decanter to the other end to remove cake from the interior decanter surfaces.

Figure 5A:
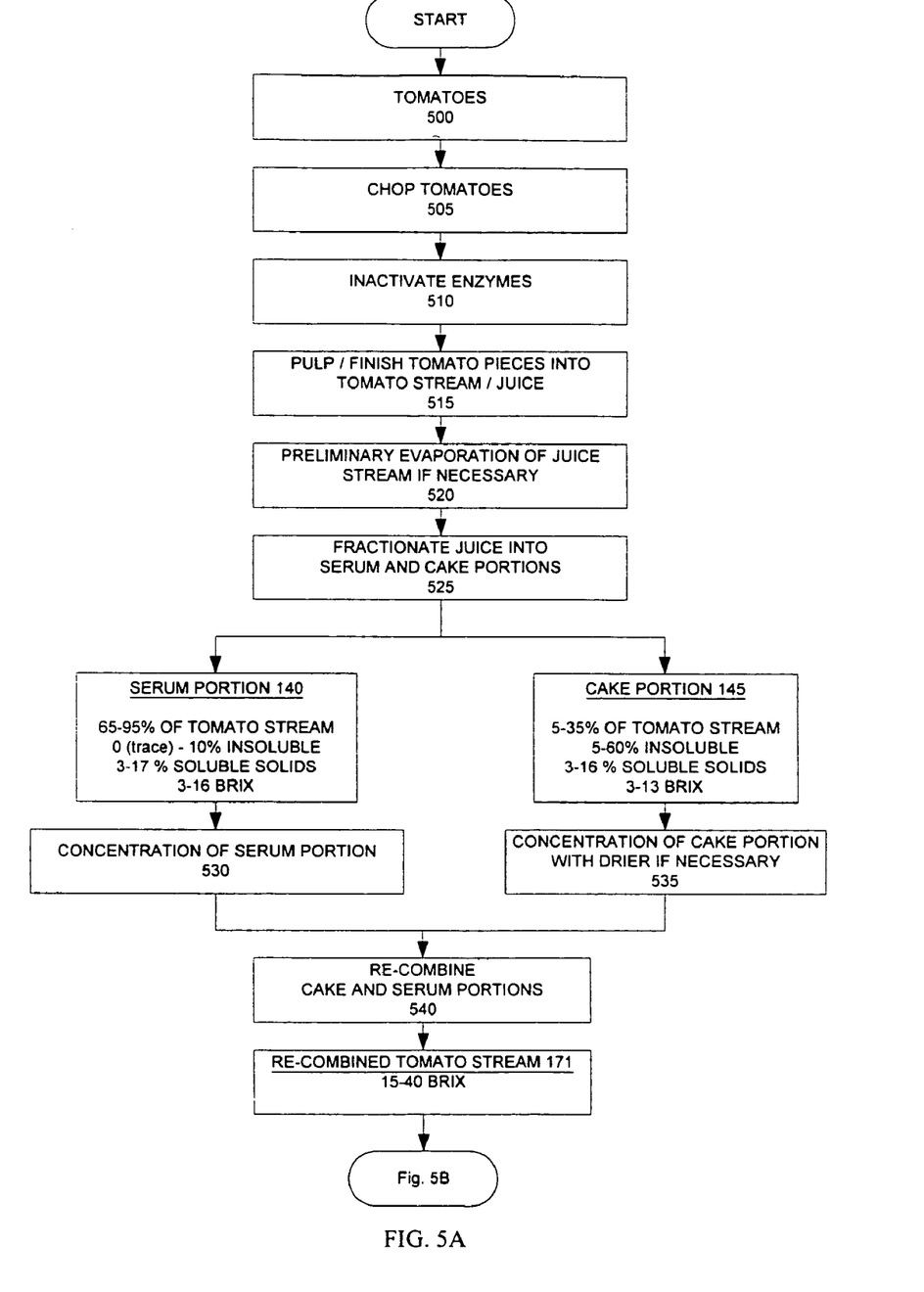
FIGS. 5A-B are flow diagrams illustrating a method of producing tomato paste by separating the tomato juice stream into cake and serum portions, and re-combining the portions to form tomato paste.

Having described the general system portions and decanter configurations, FIGS. 5A-B and 6A-B illustrate the method for processing tomatoes with the system. Referring to FIG. 5A, step 500, tomatoes are received and initially processed (e.g., cleaned, sorted, etc.). For example, a fruit dump with water flumes and a conveying elevator with water or cleaning sprays can be used. The tomatoes are transported to the chopping mechanism and, in step 505, are chopped into tomato pieces. Chopped tomatoes have a natural brix concentration of about 3-7 brix. Of course, different tomatoes and different food products can have different brix concentrations.

In step 510, enzymes are removed from or inactivated in the chopped tomato pieces. This process is referred to as "enzyme inactivation" or "enzyme breaking" or "hot breaking". More specifically, enzymes that are involved in the reduction of viscosity can be removed from or inactivated in tomato pieces, e.g., pectin galacturonase, pectin methyl esterase and other enzymes present in tomatoes that cause viscosity reduction.

Enzyme breaking can occur at "cold" or "hot" temperatures. In cold enzyme breaking, chopped tomatoes are subjected to approximately 150 to 170 degrees Fahrenheit for a period of about 1 to 10 minutes. In hot enzyme breaking, chopped tomatoes are subjected to approximately 200 to 230 degrees Fahrenheit for a period of about 15 seconds to 10 minutes. Whether hot or cold enzyme breaking is used can depend on the desired viscosity effect. For example, tomato paste made from "hot broken" tomatoes typically has higher viscosity than "cold broken" tomatoes. However, tomato paste produced with hot broken tomatoes typically has less vibrant color than tomato paste produced with cold broken tomatoes. Breaking parameters can be adjusted depending on operating parameters and the desired enzyme breaking effect.

Continuing with block 515, chopped and enzyme inactivated tomatoes are processed with a pulper or finisher, if necessary. The pulper/finisher removes solids such as skins, seeds and/or other fibrous material from the tomatoes. The pulp and fibers remaining within the finished tomatoes or "juice" are reduced to a specific size. Pulping-finishing generally occurs at a temperature of approximately 190 to 210 degrees Fahrenheit if the tomato pieces are subjected to hot breaking. If the tomato pieces are subjected to cold breaking, the pulping-finishing process can occur at approximately 150 to 170 degrees Fahrenheit.

Pulping and finishing tomato pieces results in a tomato "juice" or pulp product ("tomato juice"). However, those persons of ordinary skill in the art will recognize that "juice" can be formed by techniques besides pulping and finishing, e.g., by repeated chopping, crushing, or other actions to form juice. Thus, the tomato juice is not necessarily a product of a pulping/finishing step.

The tomato juice can be initially concentrated, if necessary, by removing water with an evaporator in step 520. The degree of evaporation can depend on the initial liquid content of the tomato juice. For example, hot tomato juice or juice processed with hot breaking can be exposed to a vacuum (e.g., 10-30° Hg) to remove a percentage of water from the juice. Thus, the more water that is removed from the juice, the more viscous or resistant to flow the juice becomes.

Continuing with step 525, tomato juice is separated or fractionated into serum and cake portions with a decanter. One example decanter configuration for separating the portions is a weir and scraper or auger configuration. The cake portion is more viscous and contains higher percentages of insoluble solids and pectins of the tomato. The cake portion can comprise about 5% to 35% of the total tomato juice stream. Further, the cake portion typically includes a large percentage or majority of lycopene and other "color" compounds. The cake portion includes about 5%-60% insoluble solids by weight and about 3-16% soluble solids by weight. The cake portion can have a concentration of about 3 to 13 brix.

The serum portion of the tomato juice stream is less viscous than the cake that includes lower percentages of insoluble solids and pectin of the tomato compared to the cake portion. The serum portion can comprise approximately 65% to 95% of the total tomato juice stream by weight. The serum portion includes about 0 (trace) amount to about 10% insoluble solids by weight and about 3%-17% soluble solids by weight. Further, the serum portion can have a concentration of about 3-16 brix.

In step 530, the serum portion 435 is concentrated. More specifically, the thin, less viscous serum fraction can be concentrated by removing water with, for example, a smaller, less robust (and less expensive) evaporator compared to evaporators used in known systems which process unfractionated tomato juice. Examples of evaporators that can be used to concentrate the serum portion in step 445 include, but are not limited to, a rising film evaporator, a failing film evaporator, a thin film evaporator, and other concentrating units such as a reverse osmosis concentrator or a direct osmosis concentrator. The serum portion can be evaporated more easily than unfractionated juice because the thinner serum can be re-circulated in the evaporator more often and more easily, resulting in improved heat transfer. Additionally, maintenance and cleaning and related costs can be reduced. As a result of lower levels of insoluble portions in the concentrated juice, less or no cake is burned onto evaporator surfaces. Utilizing smaller and less robust evaporators is also beneficial because of lower capital and operating costs. Smaller evaporators can also operate under reduced heat or temperatures, vacuum requirements, re-circulation requirements, and residence time to evaporate a given amount of water from the serum.

If necessary, in step 535, the cake portion can be concentrated. The thicker, more viscous cake portion contains higher percentages of insoluble solids and is also subjected to reduced heat, vacuum, re-circulation shear, and residence time. For example, instead of processing the thicker cake portion in the unfractionated stream with an evaporator, the cake can be concentrated using a drying mechanism such as a model no. 1 or a model no. 5 drier available from MCD Technologies, Inc., Tacoma, Wash. As a result, less cake "burn" occurs since a higher-powered evaporator is no longer necessary to concentrate the juice stream.

The fractionated cake and concentrated serum portions are re-combined in step 540 with a combination unit, e.g., a positive displacement pump or an in-line static mixer as previously described. Re-combining the cake and serum portions results in the formation of a "re-combined" or "second" tomato stream 545. The brix concentration of the second stream 545 is about 15 to 40 brix. During re-combination, all or a portion of the cake portion can be added to the concentrated serum. For example, 50%-100% of the cake can be re-combined with the concentrated serum. Indeed, other cake percentages can be used depending on particular needs and desired viscosity (viscosity increases as percentage of cake increases). Increasing cake quantities lowers the brix of the re-combined stream since the cake brix is approximately 3 to 20 brix, preferably 3-13 brix, while the serum brix is about 22-70 brix. As a result, the concentration of the re-combined stream 545 can be about 15 to 40 brix, preferably about 22-40 brix.

Figure 5B:
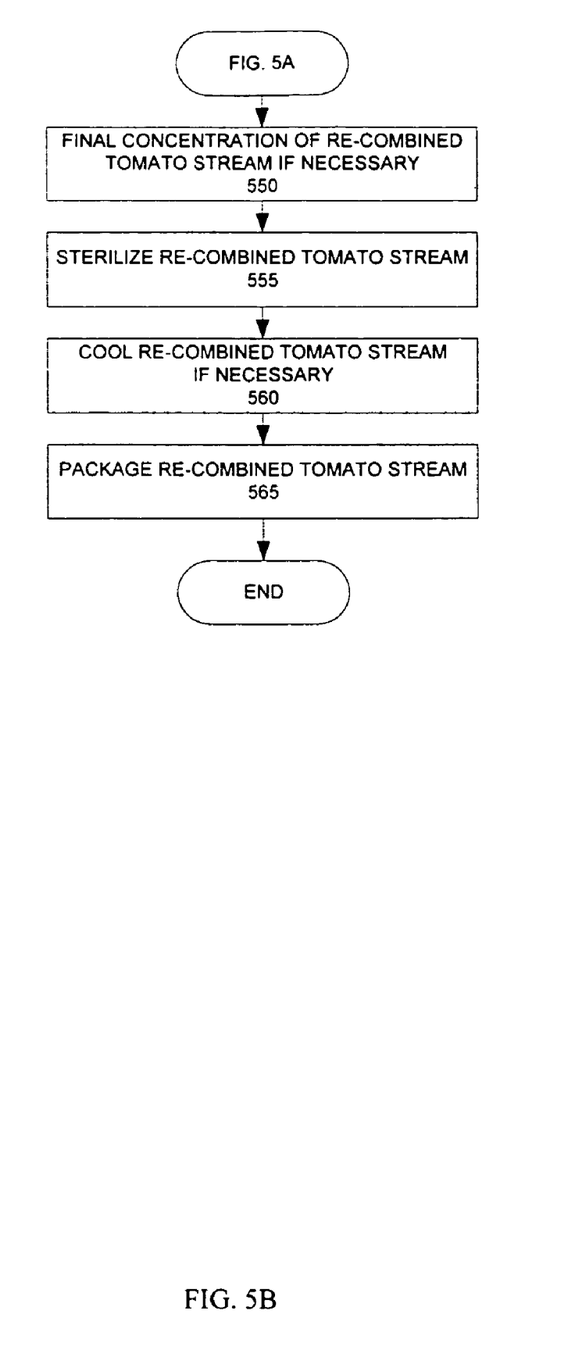

Continuing with FIG. 5B, the second or re-combined stream 545 can be further concentrated in step 550, if necessary, and sterilized as necessary in step 555. The re-combined stream is cooled if necessary in step 560. For example, the stream can be transferred to a flash cooler. Alternatively, a heat exchanger or other process may be used to cool the paste. Those persons of ordinary skill in the art will recognize that different cooling systems can be utilized. The combined stream can be packaged in step 565 or storage, shipping, sale, or consumption. As a result, the resulting tomato paste product produced with the re-combined stream has improved color, flavor and viscosity compared to tomato paste formed by processing unfractionated tomatoes.

Figure 6A:
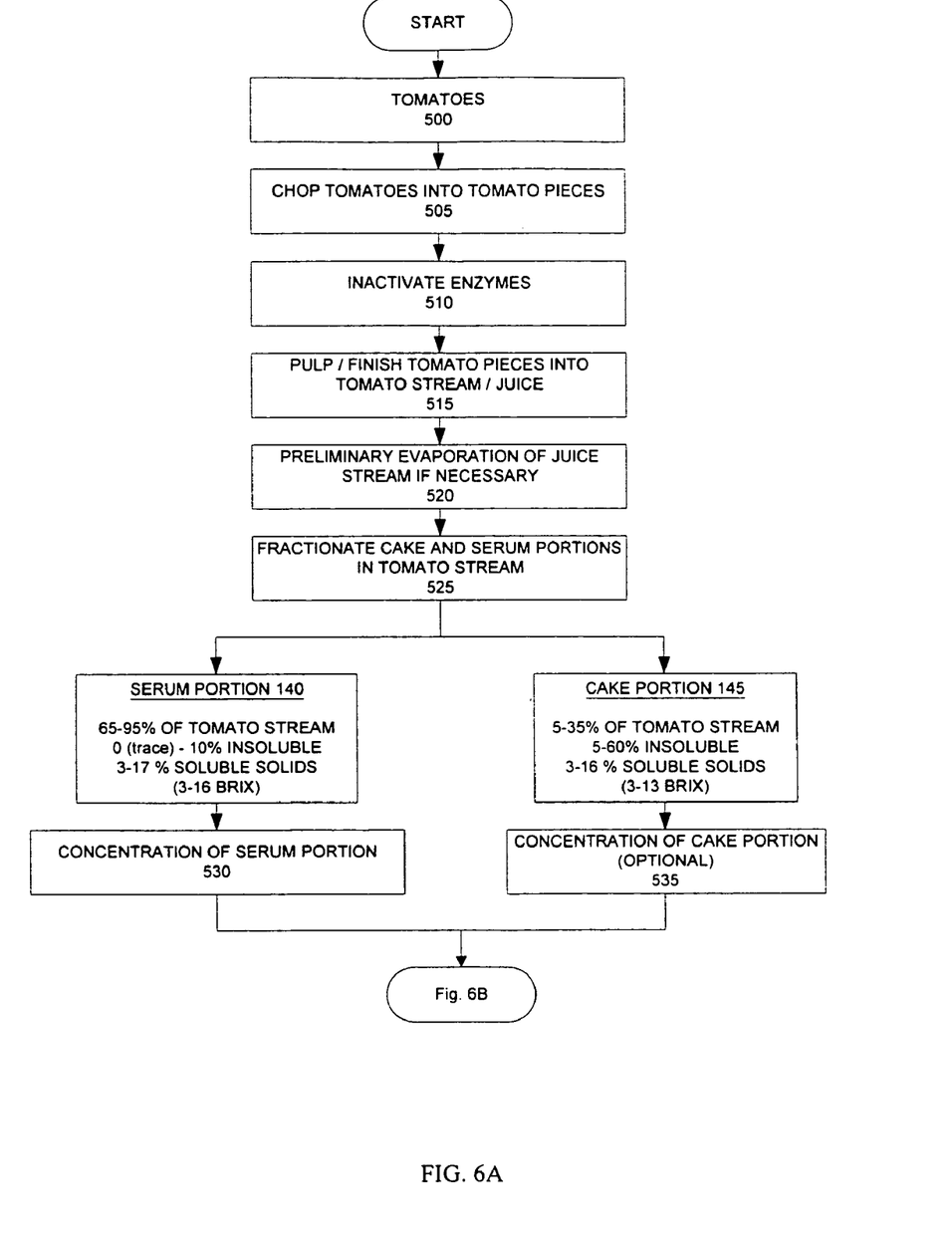
FIGS. 6A-B are flow diagrams illustrating a method of separating the tomato juice stream into cake and serum portions, and separately processing the portions.
Figure 6B:
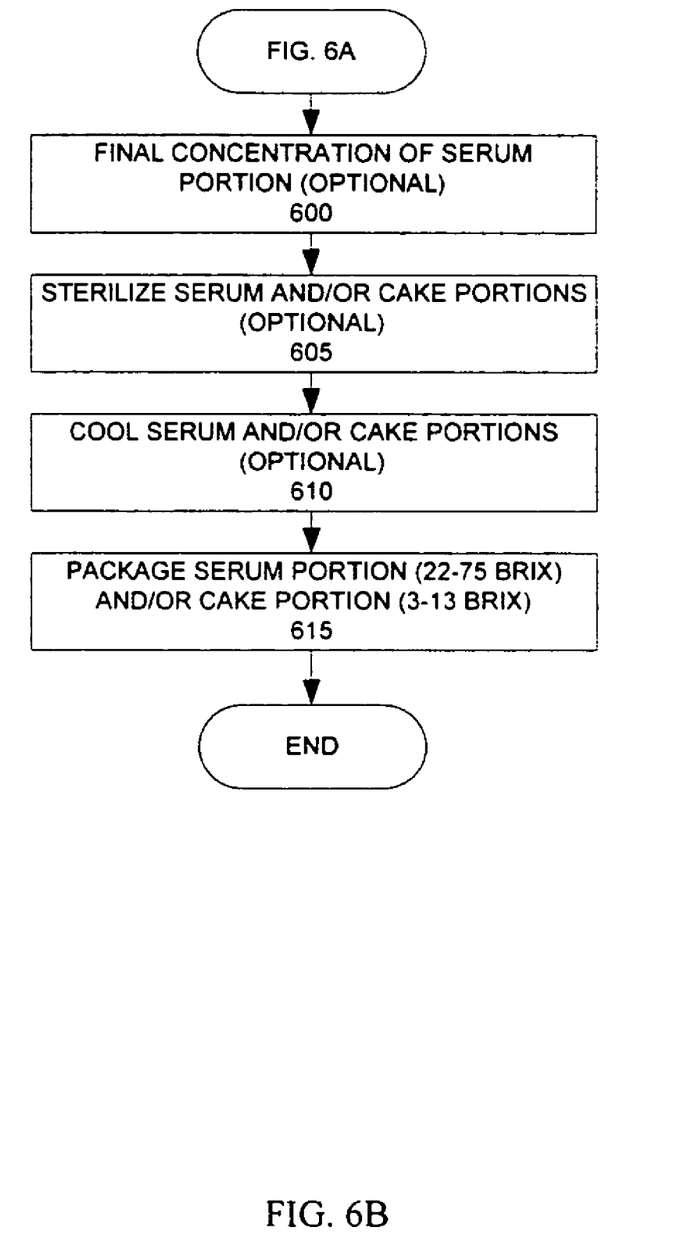

FIGS. 6A-B illustrate an alternative to the method shown in FIGS. 5A-B. In FIGS. 6A-B, the initial steps performed in the alternative method are the same as the previously describe method. Namely, in steps 500-520, tomatoes are chopped, subjected to enzyme removal or breaking, processed using a pulper/finisher, and subjected to preliminary evaporation, as necessary. The tomato stream is fractionated 525 into serum and cake portions as previously described. The serum portion is concentrated in step 530, and the cake portion can be concentrated as necessary in step 535.

Instead of re-combining the cake and serum streams as in the method of FIGS. 5A-B, the serum and cake portions in the alternative embodiment are individually processed. Specifically, in step 600, the serum portion can be further concentrated if necessary. In steps 605, the serum and cake portions are sterilized as necessary. The sterilization step may be optional if the concentration is sufficiently high to limit microbiological activity. In this alternative case, refrigerated storage may be used. In step 610, the serum and cake portions are cooled. Finally, in step 615, the serum and cake portions can be individually packaged or further processed. The fractionated cake and serum portions are packaged for subsequent storage, shipping, sale, or consumption. For example, the tomato portions are transferred to bulk bag in bins, storage tanks or other storage containers. The final serum product can have a concentration of about 22-75 brix. The final cake product can have a concentration of about 3-13 brix or can be dehydrated into a powder with less than 10% moisture.

The previously described method and system result in a tomato paste with enhanced attributes compared to tomato paste and tomato products produced by known systems. For example, tomato paste produced with the present system and method has improved color, flavor, and viscosity. Moreover, the improved tomato paste product is produced in a more cost efficient manner since smaller and less expensive and more energy-efficient evaporators can be used to fractionate the tomato juice into a more viscous and less viscous portions. As a result, reduced "burn on" occurs in the evaporator. The evaporator can concentrate the thinner serum, whereas a drying mechanism can evaporate or concentrate the cake as necessary, thereby reducing cake burn which would otherwise occur when processing unfractionated streams. Moreover, since the serum is significantly thinner than an unfractionated stream, the serum can be concentrated with the evaporator more quickly than the time required to concentrate an unfractionated stream. As a result, residence time of the products in the evaporator decreases and operating costs are reduced. Thus, the present system and method provide flexibility in selecting system portions, is more cost and time efficient, and produces higher quality tomato paste, serum, cake and other products similar or related to tomatoes.

Although references have been made in the foregoing description to various embodiments, persons of ordinary skill in the art of food preparation methods and systems will recognize that insubstantial modifications, alterations, and substitutions can be made to the described embodiments without departing from the invention as claimed in the accompanying claims. Thus, while the preferred embodiment is described as utilizing tomatoes, those skilled in the art will recognize that other similar tomato products and fruits and vegetables having similar viscosity characteristics can be processed. Further, persons of ordinary skill in the art will recognize that the example ranges of concentrations, temperatures, durations, and vacuum are recited for purposes of explanation. Indeed, other ranges can be utilized depending on the system portions and desired product characteristics. Moreover, those persons of ordinary skill in the art will recognize that various decanters, evaporators, driers and re-combiners can be used to process fractionated or re-combined cake and serum streams.

What is claimed is:

1. A system for processing a tomato juice stream to form a tomato product, comprising:
   a decanting centrifuge configured to receive the tomato juice stream, and fractionate the stream into a first portion comprising cake and a second portion comprising serum, wherein said first portion has a greater viscosity than said second portion;
   an evaporator for concentrating said second portion;
   a drier for concentrating said first portion;
   a combination unit for combining said concentrated first portion and said concentrated second portion to form the tomato product;
   a sterilizer for sterilizing the tomato product; and
   a cooler for cooling the sterilized tomato product.

2. The system of claim 1, wherein the decanting centrifuge comprises a weir and a scraping mechanism, wherein rotating the decanting centrifuge forces the first portion against an inner surface of the decanting centrifuge, the weir separating the first portion and the second portion, and the scraping mechanism removing the first portion collected along the inner surface of the decanting centrifuge.

3. The system of claim 1, wherein the tomato juice stream is formed from raw tomatoes.

4. The system of claim 1, wherein said first portion comprises about 5 % to 35 % of the tomato juice stream.

5. The system of claim 1, wherein said first portion comprises about 5 % to 60 % insoluble solids.

6. The system of claim 1, wherein said first portion comprises about 3 % to 16 % soluble solids.

7. The system of claim 1, wherein said first portion has a concentration of about 3 to 13 brix.

8. The system of claim 1, wherein said first portion includes a majority of a color compound relative to said second portion.

9. The system of claim 8, wherein said color compound comprises lycopene.

10. The system of claim 1, wherein said first portion includes a majority of insoluble solids relative to said second portion.

11. The system of claim 1, wherein said second portion comprises about 65 % to 95 % of the tomato juice stream by weight.

12. The system of claim 1, wherein said second portion comprises about 0.01 % to 10 % insoluble solids by weight.

13. The system of claim 1, wherein said second portion comprises about 3 % to 17 % soluble solids by weight.

14. The system of claim 1, wherein said second portion has a concentration of about 3 to 16 brix.

15. The system of claim 1, wherein said concentrated second portion has a concentration of about 22 to 75 brix.

16. The system of claim 1, further comprising a processing system for processing tomatoes into the tomato juice stream.

17. The system of claim 16 wherein said processing system comprises:
   a chopper for cutting tomatoes into tomato pieces; and
   a pulper for removing solids from said tomato pieces.

18. The system of claim 17 wherein said pulper is configured to remove solids comprising skins and seeds by filtering said solids with a filter screen.

19. The system of claim 16, wherein said processing system comprises an enzyme deactivation system for inactivating one or more enzymes in the tomatoes.

20. The system of claim 19, wherein said one or more enzymes is pectin galacuronase or pectin methyl esterase.

21. The system of claim 19 wherein said enzyme inactivation system is configured to inactivate said one or more enzyme by subjecting the tomato pieces or tomato juice to a temperature of about 150 to 230 degrees Fahrenheit for a period of about 15 seconds to 10 minutes.

22. The system of claim 2, wherein said decanting centrifuge defines a first portion outlet through which said first portion collected against said inner surface of said decanter is removed.

23. The system of claim 2, wherein said decanting centrifuge defines a second portion outlet through which said second portion is removed.

24. The system of claim 1, wherein said evaporator concentrates said second portion at a temperature of about 190 to about 210 degrees Fahrenheit in a vacuum of about 10 to 30 Hg.

25. The system of claim 1, wherein said evaporator is a thin film evaporator, rising film evaporator, falling film evaporator, or a thermally accelerated short time evaporator.

26. The system of claim 1, wherein said tomato product comprises tomato paste.

* * * * *